(12) United States Patent
Leow et al.

(10) Patent No.: US 6,192,150 B1
(45) Date of Patent: Feb. 20, 2001

(54) INVARIANT TEXTURE MATCHING METHOD FOR IMAGE RETRIEVAL

(75) Inventors: Wee Kheng Leow; Seow Yong Lai, both of Singapore (SG)

(73) Assignee: National University of Singapore, Singapore (SG)

( * ) Notice: Under 35 U.S.C. 154(b), the term of this patent shall be extended for 0 days.

(21) Appl. No.: 09/192,274

(22) Filed: Nov. 16, 1998

(51) Int. Cl.[7] .............................. G06K 9/00; G06K 9/46; G06K 9/36; G06F 7/00; G06F 17/30
(52) U.S. Cl. ...................... 382/190; 382/181; 382/191; 382/276; 382/305; 707/2; 707/4; 707/7
(58) Field of Search .................................. 382/181, 190, 382/191, 276, 305; 707/2, 4, 7, 100

(56) References Cited

U.S. PATENT DOCUMENTS

| 5,579,471 | * | 11/1996 | Barber et al. | 345/326 |
| 5,751,286 | * | 5/1998 | Barber et al. | 345/348 |
| 5,913,205 | * | 6/1999 | Jain et al. | 707/2 |
| 5,915,250 | * | 6/1999 | Jain et al. | 707/100 |

FOREIGN PATENT DOCUMENTS

| 4406020C1 | 6/1995 | (DE) . |
| 63-092445 | 4/1988 | (JP) . |
| 9185713 | 7/1997 | (JP) . |

OTHER PUBLICATIONS

Manjunath, et al. "texture features for browsing and retrieval of image data", IEEE, pp. 837–842, Aug. 1996.*
Remias, et al. "block–oriented image decomposition and retrieval in image database systems", IEEE, pp. 85–92, May 1996.*
Lu, et al. "texture segmentation by clustering of gabor feature vectors", IEEE, pp. 683–688, Jan., 1991.*
Dunn "an invariant pattern representation based on nonuniform sampling in the human visual system", IEEE. pp. 600–603, 1994.*
Teuner, et al. "orientation–and scale–invariant recognition of textures in multi–object scenes", IEEE, pp. 174–177, Jul. 1997.*
Xie, et al. "wavelet multiscale representation and morphological filtering for texture segmentation", IEEE, pp. 1–8, 1993.*
A structural Analyzer for a Class of Textures, Saburo Tsuji et al., Computer Graphics and Image Processing (1973) 2, 216–231.

(List continued on next page.)

*Primary Examiner*—Phuoc Tran
*Assistant Examiner*—Daniel G. Mariam

(57) ABSTRACT

A method and apparatus matches texture patterns in a way that is invariant to the intensities, scales, and orientations of the texture patterns. The texture matching apparatus includes a texture feature extractor, a feature transformer, and an image ranker. The texture feature extractor identifies regions in a plurality of stored images that contain homogeneous texture patterns that may vary in intensities, scales, and orientations, and extracts N-component texture feature vectors in these regions. The feature transformer maps the N-component feature vectors into a D-dimensional texture space that is invariant to texture intensity, scale, and orientation. The image ranker ranks the images according to the similarity between the texture patterns that they contain and the query texture measured in the D-dimensional invariant texture space, and the similarity between the N-component feature vectors of the texture patterns. The results of texture matching can be used by a content-based image retrieval system to display a list of images according to their similarity to the query texture.

24 Claims, 5 Drawing Sheets

OTHER PUBLICATIONS

The QBIC Project: Querying Images By Content Using Color, Texture, and Shape, W. Niblack et al., SPIE vol. 1908 (1993) pp. 173–181.

Detection of Homogeneous Regions By Structural Analysis, Fumiaki Tomita et al., Department of Control Engineering, Osaka University, pp. 564–571.

Content–based Retrieval of Segmented Images, Tat–Seng Chua et al., Department of Information Systems and Computer Science, pp. 211–218.

Josef Bigün et al., IEEE Transactions on Pattern Analysis And Machine Intelligence, vol. 16, No. 1, Jan. 1994 pp. 80–87.

Alan Conrad Bovik et al., IEEE Transactions on Pattern Analysis And Machine Intelligence, vol. 12, No. 1, Jan. 1990, pp. 55–73.

Dennis Dunn et al., IEEE Transactions on Pattern Analysis And Machine Intelligence, vol. 16, No. 2, Feb. 1994, pp. 130–149.

Seow Yong Lai et al., Invariant Texture Matching for Content–Based Image Retrieval, pp. 53–68.

Fang Liu et al., IEEE Transactions on Pattern Analysis And Machine Intelligence, vol. 18, No. 17, Jul. 1996 pp. 722–733.

W. Y. Ma et al., IEEE 1996, pp. 425–430.

Jianchang Mao et al., Pattern Recognition, vol. 25, No. 2, pp. 173–188.

A. Ravishankar Rao, IEEE Conference on Visualization, 1993, pp. 220–227.

Hideyuki Tamura et al., IEEE Transactions on Systems, Man, and Cybernetics, vol. 8, No. 6, Jun. 1978, pp. 460–4725.

* cited by examiner

INVARIANT TEXTURE MATCHING METHOD FOR IMAGE RETRIEVAL

BACKGROUND OF THE INVENTION

1. Field of the Invention

This invention relates to a method and an apparatus for matching a sample texture to those contained in a large collection of images; and, more particularly, to a method and an apparatus which matches texture patterns independently of the intensities, scales, and orientations of the patterns.

2. Description of Prior Art

Texture relates to a human's perception of visual characteristics such as smoothness, coarseness, and regularity of various materials. Many objects, such as brick walls, bushes, roof tiles, and fabric, can be recognized or recalled based on the distinctive texture patterns the objects contain. Therefore, texture is a very important visual cue for retrieving user-required images from large image databases.

In general, a texture matching technique for image retrieval compares a query texture image with those contained in a plurality of database images, and retrieves those database images which contain one or more texture patterns that are similar to the query texture. There are generally three conventional approaches for performing texture matching or classification, namely, the structural approach, the statistical approach, and the spectral approach.

The structural approach characterizes a texture by determining the spatial arrangement of visual primitives such as line segments, line ends, and blobs of pixels. Although there is psychological evidence supporting such a structural approach, it is difficult from a computational standpoint to determine the visual primitives and their spatial arrangements.

The statistical approach characterizes a texture in terms of numerical attributes such as local statistics and simultaneous regression. These attributes describe the statistical distribution of intensity values around a pixel. Although these numerical attributes are generally easy to compute, they do not provide a simple means of performing scale- and orientation-invariant texture matching.

The spectral approach filters texture images using a set of filters, and uses the filtered outputs as features for texture classification. Gabor filters are most commonly used for this purpose. Gabor filters can extract frequency and orientation information from the texture images. The Gabor filtering approach has been used in W. Y. Ma and B. S. Manjunath, "Texture Features and Learning Similarity," *Proceedings of IEEE Conference on Computer Vision and Pattern Recognition,* pages 1160–1169, 1996; German Patent DE 4406020; and Japanese Patent JP 09185713.

Except for the work of the present Inventors, the above-mentioned prior techniques, however, do not provide a texture matching method that is invariant to both scale and orientation. Furthermore, such existing texture matching methods assume that each image contains only a single uniform texture pattern.

SUMMARY OF THE INVENTION

It is the primary object of the present invention to provide an intensity-, scale-, and orientation-invariant texture matching apparatus and method that computes the similarity between a query texture and a plurality of images, which may contain one or more texture patterns of varying intensities, scales, and orientations, and produces a ranking of the plurality of images according to the computed similarity.

The aforementioned and other objects of the present application are achieved by providing a texture matching apparatus comprising:

a texture feature extractor for identifying a plurality of regions in a plurality of texture images, each region containing a texture pattern, extracting an N-component texture feature vector for each region, and normalizing the extracted N-component texture feature vectors;

a feature transformer for transforming the normalized N-component feature vectors into D-dimensional vector points in a D-dimensional vector space that is intensity-, scale- and orientation-invariant; and an image ranker that ranks the plurality of texture images according to their similarity to a query texture measured in the D-dimensional invariant texture space.

The aforementioned and other objects are further achieved by providing a texture matching method comprising:

identifying from a plurality of texture images a plurality of regions, each containing a texture pattern;

extracting an N-component texture feature vector for each region;

normalizing the extracted N-component texture feature vectors;

transforming the N-component feature vectors into D-dimensional vector points in a D-dimensional texture space that is invariant to the intensities, scales, and orientations of the texture patterns; and ranking the plurality of images according to their similarity to the query texture measured in the D-dimensional invariant texture space.

In one embodiment of the present invention, the texture feature extractor includes a plurality of Gabor filters with different center spatial frequencies and orientations. The preferred feature transformer includes a plurality of masks that are applied to the feature vectors to measure texture characteristics along the plurality of dimensions of the invariant texture space.

The preferred image ranker computes the similarity between two texture patterns according to the difference between their corresponding vector points in the invariant space and the difference between their feature vectors.

Further scope and applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE PREFERRED EMBODIMENTS

The following detailed description describes a technique for texture matching and image retrieval in which a query texture, selected for example by a user, is matched with a plurality of stored images. Each stored image may contain a single texture pattern, such as sand, grass, or brick, and may also be an image of a natural scene, such as the outdoors, buildings, or other scenery, which contains multiple texture patterns.

System Overview

Figure 1:
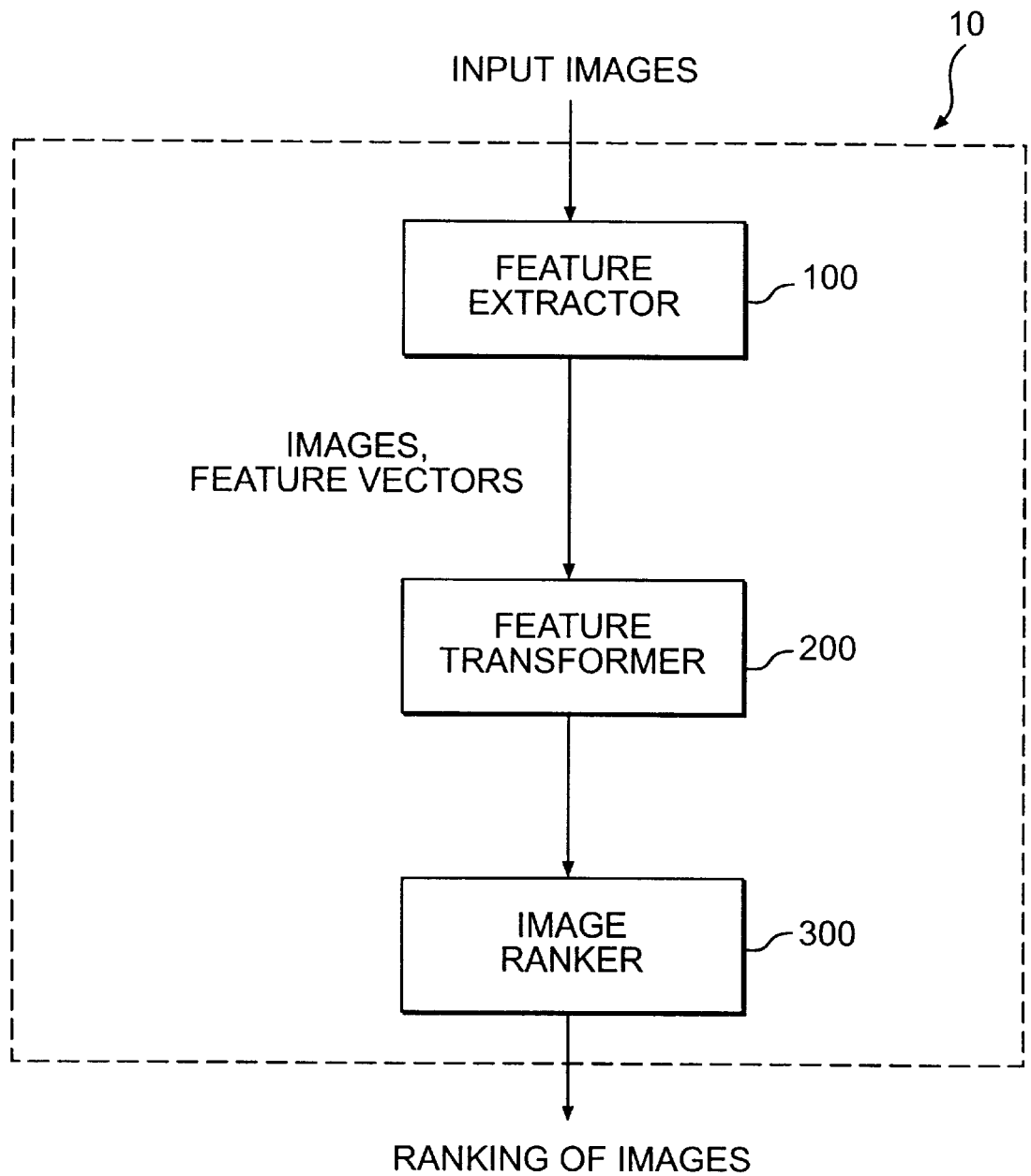
FIG. 1 represents a schematic block diagram of a texture matching system in accordance with the present invention.

FIG. 1 illustrates an overview of the texture matching and image retrieval system 10 according to an embodiment of the present invention. The system 10 shown in FIG. 1 includes three main processing elements: a feature extractor 100, a feature transformer 200, and an image ranker 300.

As shown in FIG. 1, a plurality of images are initially fed into the feature extractor 100. As mentioned above, each image may contain a single texture pattern or multiple texture patterns.

The feature extractor 100 identifies, in each image, regions that contain homogeneous texture patterns. Such texture patterns may have varying intensities, scales, and orientations. The feature extractor 100 extracts a plurality of features that characterize each texture pattern which are collectively represented as a feature vector.

The feature transformer 200 converts the extracted feature vectors output by the feature extractor 100 to a representation that is invariant to intensity, scale, and orientation differences between like texture patterns. The image ranker 300 then utilizes the feature representations output by the feature transformer to identify stored images which include at least one texture pattern which matches a query texture, and ranks such images in order of similarity to the query texture. The functions of the feature extractor 100, the feature transformer 200, and the image ranker 300 are discussed in greater detail below.

Feature Extraction

Figure 2:
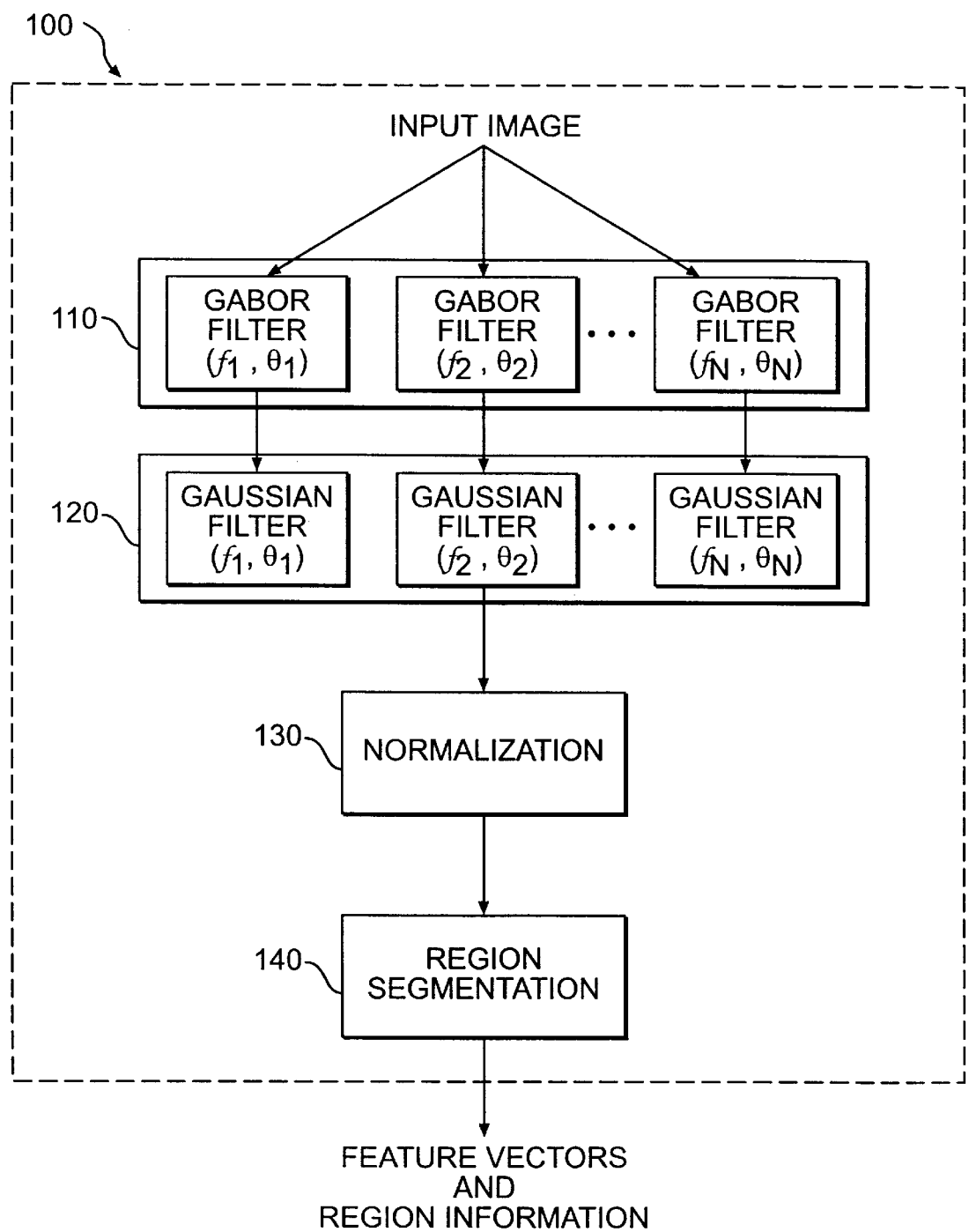
FIG. 2 shows a detailed block diagram of a texture feature extractor incorporated in the system shown in FIG. 1.

Referring to FIG. 2, there is shown a detailed block diagram of the feature extractor 100, which includes a Gabor filter bank 110, a Gaussian filter bank 120, a normalization stage 130, and a region segmentation stage 140.

The Gabor filter bank 110 includes N Gabor filters, each of which has a different center spatial frequency fi and orientation θi, for i=1, ..., N, where N is a positive integer. The Gabor filters of the Gabor filter bank 110 extract texture features at a plurality of spatial frequencies and orientations. It is preferred that the Gabor filters have overlapping filter supports so as to improve the robustness of the extracted features. Other features or operators that possess spatial frequency and orientation selectivity, such as oriented wavelets, may also be used.

The Gabor filters' energy outputs are fed into a bank of Gaussian filters 120 having N oriented Gaussian filters. The Gaussian filters of the Gaussian filter bank 120 remove noise and local variations introduced by the sinusoidal terms of the Gabor filters of the Gabor filter bank 110. The Gaussian filters have the same aspect ratios and orientations as the Gabor filters but larger scale parameters. Other smoothing filters besides Gaussian filters may also be used.

The outputs of the Gaussian filter bank 110 are combined at the normalization stage 130 in the following manner: the N filters' outputs at a particular pixel location (x,y) together form an N-component feature vector at that location. For each N-component feature vector at each pixel location, the components of the feature vector are normalized by dividing each component value by the value of the largest component. This normalization process removes variations due to intensity differences, thereby providing an intensity-invariant feature vector. The resulting normalized N-component feature vectors are thus utilized as extracted feature vectors for subsequent processing.

The extracted feature vectors from the normalization stage 130 are fed to the region segmentation stage 140. The region segmentation stage 140 groups neighboring feature vectors that are similar into the same regions. Similarity between feature vectors can be measured several ways, including the cosine of two vectors and the normalized Euclidean distance. During grouping, the region segmentation stage 140 averages the feature vectors within each region to obtain an average feature vector for each region. After grouping, the region segmentation stage 140 produces a list of the texture regions, and the average feature vector for each region.

The results produced by the region segmentation stage 140 and the corresponding images may be stored in an image retrieval system such as described by T. S. Chua, S. K. Lim, and H. K. Pung in "Content-Based Retrieval of Segmented Images," *Proceedings of ACM Multimedia Conference*, pages 211–218, 1994; U.S. Pat. Nos. 5,579,471; and 5,751, 286 which are herein incorporated by reference. During an image retrieval operation, a user may retrieve a desired image by selecting a query texture chosen from the sample texture in the database, which is then used to retrieve stored images containing the query texture.

Feature Transformation

The feature transformer 200 obtains the N-component feature vector of the query texture, and the N-component feature vectors extracted from the images stored in the image database in a manner discussed above. The feature transformer then transforms such N-component feature vectors into vector points in a D-dimensional intensity, scale, and orientation invariant texture space, where D is a positive integer.

Figure 3:
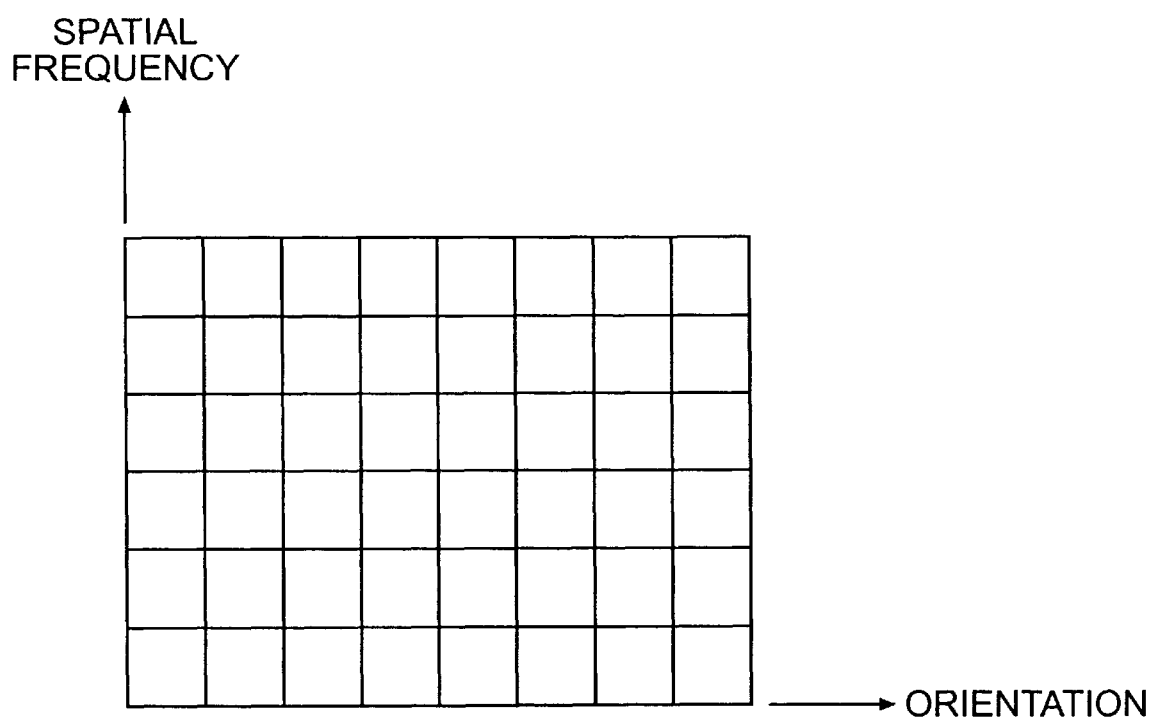
FIG. 3 depicts a 2-dimensional representation of a feature vector in accordance with the present invention.
Figure 4A:
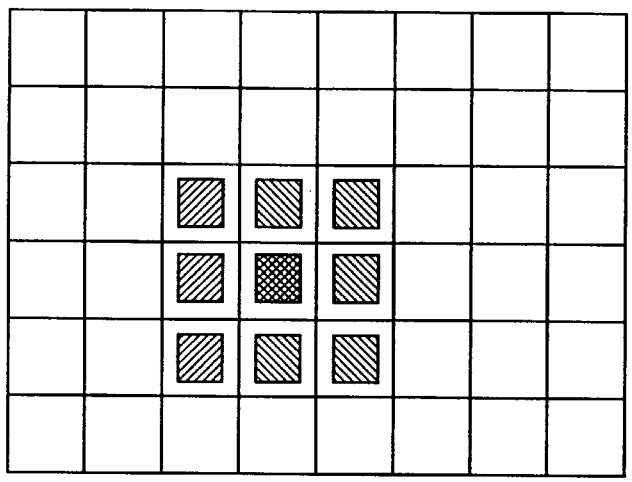
FIGS. 4A to 4C depict the appearance of three texture characteristics, with black squares representing large vector component values and white squares representing small vector component values.
Figure 4B:
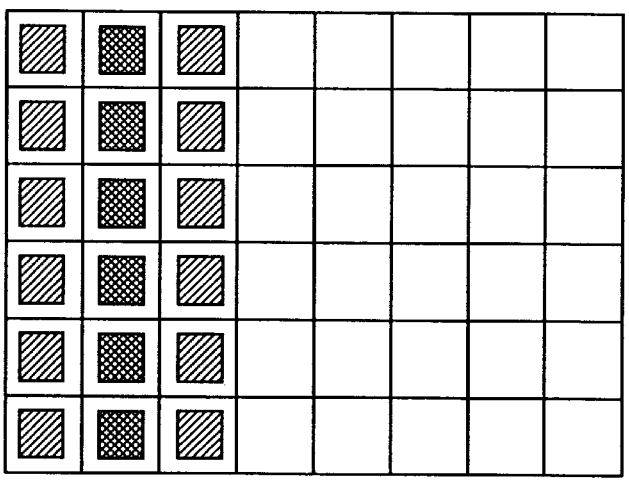
Figure 4C:
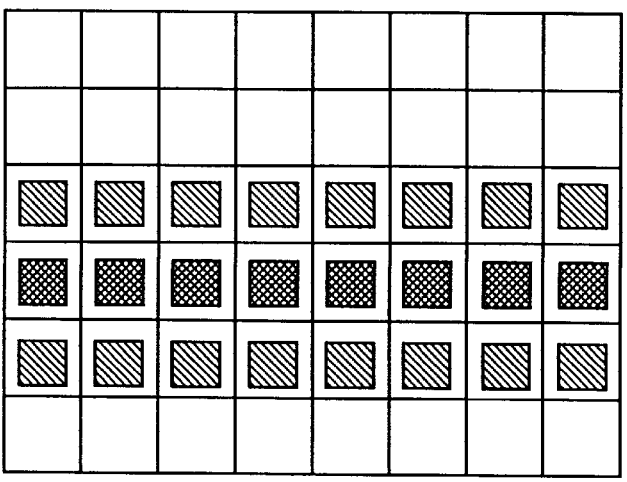

Each dimension of the invariant texture space represents a texture characteristic salient to human perception such as structuredness, orientedness, and granularity. Initially, each N-component feature vector is arranged in a 2-dimensional representation, such as seen in FIG. 3. A first dimension of the 2-dimensional representation corresponds to spatial frequency, while the other dimension corresponds to orientation. In this 2-dimensional representation, texture characteristics are manifested as distinct patterns. For example, the N-component feature vector for a structured texture appears as a localized patch when arranged in the 2-dimensional space, such as seen in FIG. 4A; the N-component feature vector for a texture with a high degree of orientedness appears as a column when arranged in the 2-dimensional space, such as seen in FIG. 4B; and the N-component feature vector with a high degree of granularity appears as a row when arranged in the 2-dimensional space, as seen in FIG. 4C. In each of FIGS. 4A–4C, black squares represent large vector component values and lighter squares represent small vector component values.

The amount of each texture characteristic present in an N-feature vector which has been mapped to the 2-dimensional space can be measured by applying a template matching technique as follows: generate masks which detect various types of patterns, such as the patch-shaped, row-shaped, and column-shaped patterns illustrated in FIGS. 4A–4C; apply a mask to each local region in the 2-D representation; and compute the similarity values between the mask and the local region. The highest similarity value gives a measure of the amount of texture characteristic, corresponding to the mask, present in the feature vector. D texture characteristics are measured for a feature vector, one along each dimension of the texture space, and together form a D-component vector in the texture space.

Image Ranking

The D-component vectors of the query texture and texture patterns in the images are fed into the image ranker 300 which computes the similarity between the query texture and each texture pattern in the stored images. The preferred way to compute such a similarity is to calculate the Euclidean distance between the D-component vector of the query texture and the D-component vectors of the texture patterns in the images. The larger the Euclidean distance, the smaller the similarity. After computing the similarity in the D-dimensional texture space, the image ranker 300 ranks the texture patterns in decreasing order of similarity.

The image ranker 300 may also refine the ranking order as follows. Starting from the top of the ranking order, the image ranker 300 computes the similarity between a texture pattern and P neighboring patterns down the rank list, where P is a small positive integer. The preferred measure of similarity is the normalized cosines of the N-component feature vectors of the texture patterns. Neighboring patterns that are more similar than other neighboring patterns are moved up in the ranking order. This procedure is repeated for every texture pattern in the ranked list.

After rank refinement, the ranked list of texture patterns is used to generate a ranked list of images by determining the images that contain the individual texture patterns. If an image appears more than once in the list, the instance with the highest ranking is retained and each other occurrence of the image in the list is removed. The image ranker 300 outputs the ranked list of images as the final output.

Computer Implementation

Figure 5:
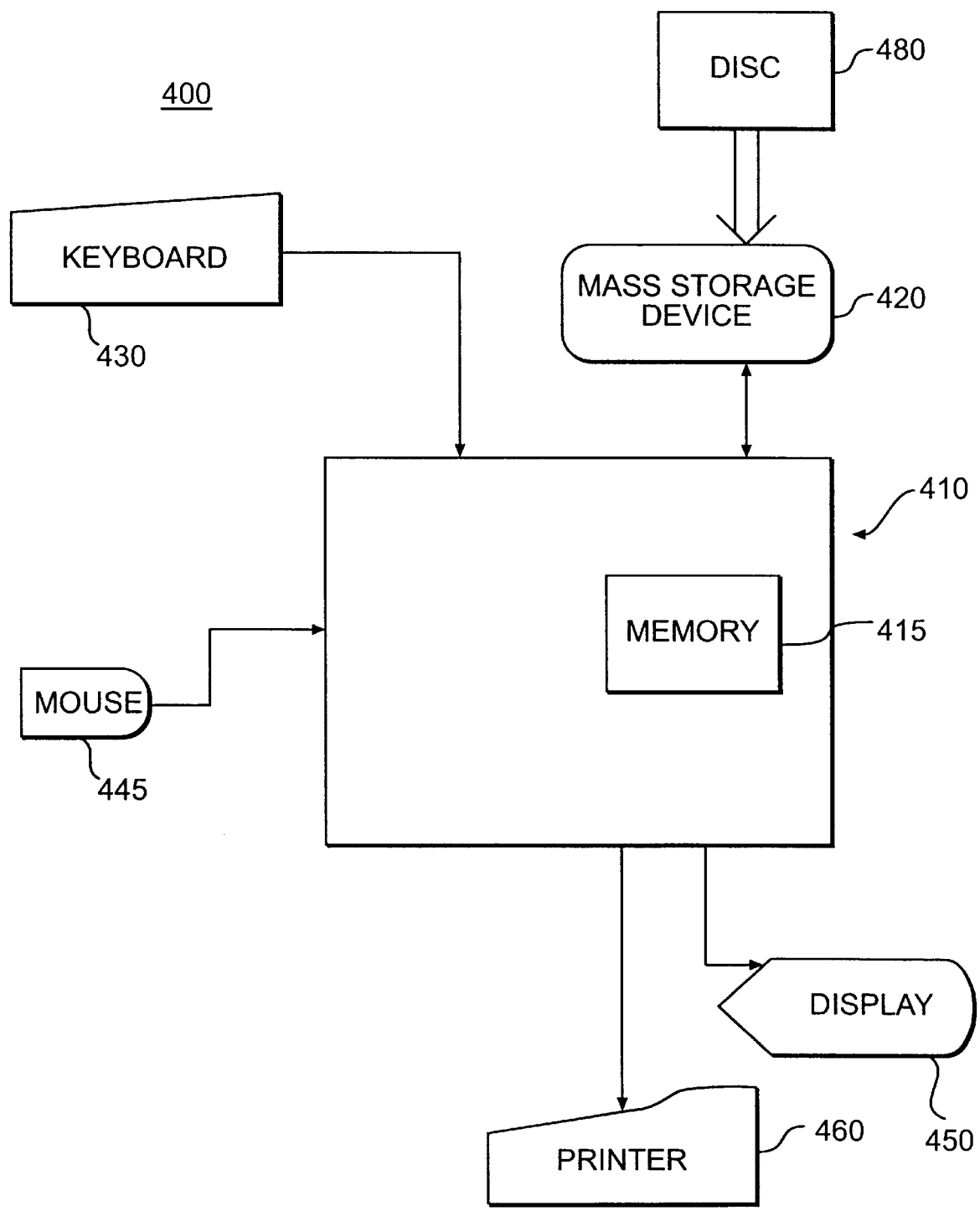
FIG. 5 is a block diagram of a computer suitable for implementing the texture matching technique according to the present invention.

A computer system suitable for implementing the texture matching technique according to the present invention is shown in the block diagram of FIG. 5. The computer 410 is preferably part of a computer system 400.

To allow human interaction with the computer 410, the computer system includes a keyboard 430 and a mouse 445. For outputting texture matching results, the computer system 400 also includes a display 450 such as a cathode ray tube or a flat panel display, and a printer 460.

The computer system 400 also includes a mass storage device 420, which may be, for example, a hard disk, floppy disc, optical disc, etc. The mass storage device may be used to store a computer program which enables the texture matching method to be executed when loaded in the computer 410. As an alternative, the mass storage device 420 may be a network connection or off-line storage which supplies a program to the computer. More particularly, a program embodying the texture matching and image retrieval technique of the present invention may be loaded from the mass storage device 420 into the internal memory 415 of the computer 410. The result is that the general purpose computer 410 is transformed into a special purpose machine which implements the texture matching method of the present invention.

A computer readable medium, such as the disc 480 in FIG. 5 may be used to load computer-readable code into the mass storage device 420, which may then be transferred to the computer 410. In this way, the computer 410 may be instructed to perform the inventive texture matching and image retrieval technique disclosed herein.

As demonstrated above, the present invention ranks images according to the similarity between the query texture and the texture patterns that the images contain. The result may be used by a content-based image retrieval system to display the images according to their similarity compared to the query texture.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for matching a query texture with a plurality of images, each containing a plurality of textured regions, said apparatus comprising:

feature extraction means for identifying a plurality of regions in the plurality of images, each region containing a texture pattern, extracting an N-component feature vector for each region, and normalizing the extracted N-component feature vectors, where N is an even integer greater than or equal to 2;

normalization means for normalizing the extracted N-component texture feature vectors;

arranging means for arranging each N-component feature vector into a 2-dimensional representation with spatial frequency increasing along one dimension and orientation changing in another dimension;

extraction means for extracting D texture characteristics that are invariant to texture scale and orientation from each 2-dimensional representation and forming a D-dimensional feature vector, where D for said D texture characteristics and said D-dimensional is an integer greater than 1;

computing means for computing the similarity between the query texture and the plurality of images according to the similarity between a D-dimensional feature vector of the query texture and the D-dimensional feature vectors of the plurality of textured regions in the plurality of images; and image ranking means for ranking the plurality of images according to their similarity to the query texture.

2. The apparatus of claim 1, wherein said feature extraction means includes a plurality of Gabor filters.

3. The apparatus of claim 2, wherein said plurality of Gabor filters have overlapping filter supports.

4. The apparatus of claim 1, wherein said feature extraction means performs oriented wavelet transform.

5. The apparatus of claim 1, wherein said feature extraction means normalizes an N-component feature vector by dividing the value of each feature vector component by the value of the largest component.

6. The apparatus of claim 1, wherein said means for computing D texture characteristics comprises:

means for storing a plurality of 2-dimensional masks;

means for computing a similarity value between each 2-dimensional mask and a local patch of the 2-dimensional representation of a feature vector; and means for finding the largest similarity value over the entire 2-dimensional representation.

7. The apparatus of claim 6, wherein one mask identifies patch-shaped patterns in the 2-dimensional representation.

8. The apparatus of claim 6, wherein one mask identifies column-shaped patterns in the 2-dimensional representation.

9. The apparatus of claim 6, wherein one mask identifies row-shaped patterns in the 2-dimensional representation.

10. The apparatus of claim 1, wherein said image ranking means comprises:

means for arranging the texture patterns in a ranked list in order of similarity computed in the D-dimensional texture space;

means for computing the similarity between the N-component vector of a texture pattern and the N-component vector of P neighboring texture patterns down the ranked list where P is an integer greater than or equal to 1;

means for re-ranking neighboring texture patterns with larger similarity between the N-component vectors higher on the ranked list and patterns with smaller similarity lower on the ranked list;

means for mapping the ranked list of texture patterns into a ranked list of images by determining the images that contain the respective texture patterns of the ranked list of texture patterns; and means for removing redundant images with smaller similarities from the ranked list of images.

11. The apparatus of claim 10, wherein said means for computing similarity in the D-dimensional texture space calculates Euclidean distances between D-dimensional vectors.

12. The apparatus of claim 10, wherein said means for computing similarity between N-component feature vectors calculates the normalized cosine between N-component feature vectors.

13. A method for matching a query texture with a plurality of images, each containing a plurality of textured regions, said method comprising:

identifying from the plurality of images a plurality of regions, each containing a texture pattern;

extracting and N-component texture feature vector for each region, where N is an even integer greater than or equal to 2;

normalizing the extracted N-component texture feature vectors;

arranging each N-component texture feature vector into a 2-dimensional representation with spatial frequency increasing along one dimension and orientation changing in another dimension;

extracting D texture characteristics that are invariant to texture scale and orientation from each 2-dimensional representation and forming a D-dimensional feature vector, where D for said D texture characteristics and said D-dimensional is an integer greater than 1;

computing the similarity between the query texture and the plurality of images according to the similarity between a D-dimensional feature vector of the query texture and the D-dimensional feature vectors of the plurality of textured regions in the plurality of images; and ranking the plurality of images according to their similarity to the query texture.

14. The method of claim 13, wherein said N-component feature vectors are extracted using a plurality of Gabor filters.

15. The method of claim 14, wherein said plurality of Gabor filters have overlapping filter supports.

16. The method of claim 13, wherein said N-component feature vectors are extracted using oriented wavelet transformers.

17. The method of claim 13, wherein said N-component feature vectors are normalized by dividing the value of each feature vector component by the value of the largest component.

18. The method of claim 13, wherein said D texture characteristics are computed by:

retrieving a plurality of 2-dimensional masks;

computing the similarity value between a 2-dimensional mask and a local patch of a 2-dimensional representation; and finding the largest similarity value over the entire 2-dimensional representation.

19. The method of claim 18, wherein one 2-dimensional mask identifies patch-shaped patterns in the 2-dimensional representation.

20. The method of claim 18, wherein one 2-dimensional mask identifies column-shaped patterns in the 2-dimensional representation.

21. The apparatus of claim 18, wherein one 2-dimensional mask identifies row-shaped patterns in the 2-dimensional representation.

22. The method of claim 13, wherein said ranking step is performed by:

arranging the texture patterns in a ranked list in order of similarity computed in the D-dimensional texture space;

computing the similarity between the N-component vector of a texture pattern and P neighboring texture patterns down the ranked list where P is an integer greater than or equal to 1;

moving neighboring texture patterns with larger similarity between the N-component vectors higher on the list and texture patterns with smaller similarity lower on the list;

mapping the ranked list of texture patterns into a ranked list of images by determining the images that contain the ranked texture patterns; and removing redundant images with smaller similarities.

23. The method of claim 22, wherein similarities in the D-dimensional texture space are computed by calculating Euclidean distances between D-dimensional vectors.

24. The method of claim 22, wherein similarities between N-component feature vectors are computed by calculating the normalized cosine N-component between vectors.

* * * * *